United States Patent Office 3,104,259
Patented Sept. 17, 1963

3,104,259
METHOD OF PREPARING PHOSPHINIC CHLORIDES
Harold J. Harwood and Kenneth A. Pollart, Dayton, Ohio, assignors to Monsanto Chemical Company, St. Louis, Mo., a corporation of Delaware
No Drawing. Filed July 20, 1959, Ser. No. 828,043
5 Claims. (Cl. 260—543)

The present invention relates to the method of preparing organic compounds of phosphorus and more particularly provides a new and improved process for the preparation of dihydrocarbylphosphinic halides of the formula

in which R and R' are hydrocarbyl radicals free of aliphatic unsaturation and containing from 1 to 8 carbon atoms and X is chlorine or bromine.

In prior art, the dialkylphosphinic halides have been obtainable only with difficulty and in small yields. Thus, as reported by H. Jean et al., Bull. Soc. Chim. France (1956), 569–70, from the mixture of reaction products obtained from either methylmagnesium chloride or ethylmagnesium chloride there is obtained upon dry vacuum distillation only a 10% yield of the dimethylphosphinic chloride or the diethylphosphinic chloride. The compounds $RPOCl_2$ or $R_2POCl$ (where R is methyl or ethyl) are said to remain strongly complexed to magnesium and can only be partially separated by using ether as a solvent. When methylmagnesium bromide is used instead of the corresponding chloride, the products contain bromine.

Now we have found that the dihydrocarbylphosphinic halides are readily prepared by the reaction of a tetrahydrocarbyl bi(phosphine sulfide) with thionyl chloride or bromide substantially according to the scheme

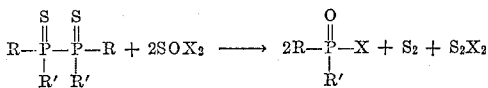

wherein R and X are as herein defined.

The tetrahydrocarbyl bi(phosphine sulfides) are readily available by the reaction of an appropriate hydrocarbylmagnesium halide with thiophosphoryl chloride, e.g., as described by Reinhardt et al., Chem. Ber. 1956 (1957), who thus obtained the tetramethyl bi(phosphine sulfide) in an 85% theoretical yield.

These investigators reported that oxidation of the bi(phosphine sulfide) gave dimethylphosphinic acid. Chlorination of the latter did not give the dimethylphosphinic chloride; instead, the product was methyl(trichloromethyl)phosphonic acid.

We have found that the use of thionyl halides with the tetrahydrocarbyl bi(phosphine sulfides) results in a cleavage, a replacement of the sulfide sulfur by oxygen and addition of the halogen to the cleaved fragment. Separation of the dihydrocarbylphosphinic halides thus formed presents no problem, for there is generally required only removal of the by-product sulfur and sulfur monochloride and of any diluent which may have been used. The present invention thus provides a facile method for the preparation of numerous dihydrocarbylphosphinic chlorides.

There are thus prepared according to the invention, dialkylphosphinic chlorides or bromides from the appropriate tetralkyl bi(phosphine sulfides) and thionyl chloride or bromide; the diarylphosphinic chlorides or bromides from the appropriate tetraaryl bi(phosphine sulfides) and thionyl chloride or bromide; the alkylarylphosphinic chlorides or bromides from the dialkyldiaryl bi(phosphine sulfides) and thionyl chloride or bromide; the bis-(aralkyl)phosphinic chlorides or bromides from the appropriate tetrakis(aralkyl) bi(phosphine sulfides); the bis-(alkaryl)phosphinic chlorides or bromides from the appropriate tetrakis(alkaryl) bi(phosphine sulfides) and thionyl chloride or bromide; alkyl(alkaryl)phosphinic chlorides or bromides from dialkylbis(alkaryl) bi(phosphine sulfides) and thionyl chloride or bromide; the dicycloalkylphosphinic chlorides or bromides from tetracycloalkyl bi(phosphine sulfides) and thionyl chloride or bromide; the alkylcycloalkylphosphinic chlorides or bromides from dialkyldicycloalkyl bi(phosphine sulfides) and thionyl chloride or bromide, etc.

Thus, there are shown below examples of dialkylphosphinic halides prepared according to the reaction:

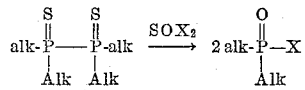

| alk = | Alk = | X |
|---|---|---|
| methyl | methyl | Cl |
| ethyl | ethyl | Cl |
| propyl | propyl | Cl |
| isopropyl | isopropyl | Cl |
| ethyl | methyl | Cl |
| butyl | butyl | Cl |
| methyl | methyl | Br |
| pentyl | pentyl | Cl |
| butyl | propyl | Cl |
| isobutyl | isobutyl | Cl |
| hexyl | hexyl | Cl |
| ethyl | ethyl | Br |
| heptyl | heptyl | Cl |
| octyl | octyl | Cl |
| 2-ethylhexyl | 2-ethylhexyl | Cl |
| Do | methyl | Br |
| butyl | butyl | Br |

Shown below also are other examples of other dihydrocarbylphosphinic halides prepared according to the reaction:

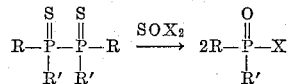

| R = | R' = | X = |
|---|---|---|
| methyl | phenyl | Cl |
| ethyl | do | Cl |
| methyl | do | Br |
| isopropyl | do | Cl |
| butyl | do | Br |
| 2-ethylhexyl | do | Cl |
| methyl | 4-tolyl | Cl |
| ethyl | 3-tolyl | Br |
| pentyl | 1,4-xylyl | Cl |
| methyl | 4-ethylphenyl | Cl |
| phenyl | phenyl | Cl |
| benzyl | methyl | Cl |
| cyclohexyl | cyclohexyl | Cl |
| cyclopentyl | cyclopentyl | Cl |
| 2-methylcyclopentyl | methyl | Br |
| cyclopropyl | cyclopropyl | Cl |
| cyclohexyl | ethyl | Cl |
| benzyl | benzyl | Cl |
| Do | cyclohexyl | Cl |

The dihydrocarbylphosphinic chlorides or bromides are stable, well-defined compounds which are useful either per se, e.g., as oil-additives, biological toxicants, etc., or as intermediates for the preparation of a wide variety of organic phosphorous compounds. The halogen atom of the dihydrocarbylphosphinic chlorides is very reactive; hence the presently prepared compounds can be reacted, e.g., with ammonia or amines to give the dihydrocarbylphosphinic amides, with dialkylamines to give the N,N-dialkyldihydrocarbylposphinic amides; with alcohols to give a variety of alkyl phosphinates; with glycols or alkylene oxides to give hydroxyalkyl phosphinates; with mercaptans to give phosphinothioates, etc. The provision of an easy method of obtaining the dihydrocarbylphosphinic halides thus affords to the art a means of preparing innumerable derivatives of the phosphinic acids.

Reaction of the tetrahydrocarbyl bi(phosphine sulfide) with the thionyl chloride or bromide for preparation of the dihydrocarbylphosphinic halide takes place at ordinary, increased or decreased temperatures, depending upon the nature of the individual bi(phosphine sulfide), and of the thionyl halide. Using the quite reactive lower tetraalkyl bi(phosphine sulfides), it is preferred to initiate the reaction by adding the thionyl halide to the sulfide in small increments and at ordinary or decreased temperatures, say at a temperature of from 0° to 10° C.

Heating at, say, 50° C. to 125° C. and preferably at the refluxing temperature of the reaction mixture may then be employed to complete the reaction. Since the bi(phosphine sulfides) are generally crystalline solids, the reaction is generally conducted in the presence of inert liquid diluents or solvents, e.g., benzene, xylene, hexane, dioxane, ether, acetone, chloroform, etc. Completion of the reaction can be generally ascertained, e.g., by noting cessation in change of color of the reaction mixture. The proportions of sulfide and thionyl halide are advantageously employed in the stoichiometric proportions, i.e., two moles of the thionyl chloride or bromide per mole of the tetrahydrocarbyl bi(phosphine sulfide). However, an excess of the thionyl chloride may be used and is often recommended to assure participation in the reaction of all of the less readily available bi(phosphine sulfides).

The invention is further illustrated by, but not limited to, the following examples:

*Example 1*

A suspension of 8.0 g. of tetramethyl bi(phosphine sulfide) in 35 ml. of benzene was cooled by means of an ice-bath, and 15 ml. of thionyl chloride was slowly added to the suspension, with shaking, during 5 minutes. The resulting solution turned into a milky yellow emulsion as cooling was continued. After refluxing for 45 minutes on the water-bath, the excess thionyl chloride and benzene were removed under water pump pressure; and subsequent distillation of the residue gave 8.3 g. (83.4% theory) of the substantially pure dimethylphosphinic chloride, B.P. 110–113° C./35 mm. and M.P. 68–72° C.

*Example 2*

To a solution of 8 g. (0.0333 mole) of tetraethyl bi(phosphine sulfide) in 30 ml. of benzene there was slowly added, with ice-cooling, 15 ml. (0.208 mole) of thionyl chloride. The yellowish-white emulsion which formed was then heated at reflux for 1 hour. Benzene and excess thionyl chloride were then removed under reduced pressure, leaving a mixture of immiscible liquids. Continued distillation yielded sulfur monochloride, 0.9 g. B.P. 65–80° C./35 mm. $n_D^{25}$ 1.6183. Upon cooling, sulfur (1.8 g.) precipitated out. This was removed and the residual liquid was distilled to give 6.2 g. of the diethylphosphinic chloride, B.P. 62.5–64.5° C./0.65–0.75 mm., B.P. 60.5–63.0° C./0.4–0.55 mm. The purity of the compound was attested to by the fact it gave a negative sodium fusion test for sulfur.

What we claim is:

1. The method which comprises contacting, with thionyl chloride, a bi(phosphine sulfide) of the formula

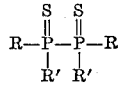

where R and R' are hydrocarbyl radicals free of aliphatic unsaturation and containing from 1 to 8 carbon atoms, and recovering from the resulting reaction product a phosphinic halide of the formula:

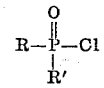

wherein R and R' are as herein defined.

2. The method which comprises contacting, with thionyl chloride, in the presence of an inert liquid diluent a bi(phosphine sulfide) of the formula

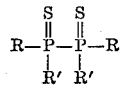

where R and R' are hydrocarbyl radicals free of aliphatic unsaturation and containing from 1 to 8 carbon atoms, and recovering from the resulting reaction product a phosphinic halide of the formula:

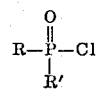

wherein R and R' are as herein defined.

3. The method which comprises contacting with thionyl chloride, in the presence of an inert diluent, a tetralkyl bi(phosphine sulfide) having from 1 to 8 carbon atoms in each alkyl radical and recovering from the resulting reaction product a dialkylphosphinic chloride having from 1 to 8 carbon atoms in the alkyl radical.

4. The method which comprises contacting tetramethyl bi(phosphine sulfide) with thionyl chloride in the presence of an inert liquid diluent and recovering dimethylphosphinic chloride from the resulting reaction product.

5. The method which comprises contacting tetraethyl bi(phosphine sulfide) with thionyl chloride in the presence of an inert liquid diluent and recovering diethylphosphinic chloride from the resulting reaction product.

References Cited in the file of this patent

FOREIGN PATENTS 1,056,606    Germany _____ May 6, 1959

OTHER REFERENCES

Poshkus et al.: J.A.C.S., volume 80, pp. 5022–5027 (1958). (Copy in Sci. Library.)